United States Patent
Ishimoda et al.

(10) Patent No.: US 10,345,573 B2
(45) Date of Patent: Jul. 9, 2019

(54) LENS BARREL AND LOUPE

(71) Applicant: KONICA MINOLTA, INC., Chiyoda-ku (JP)

(72) Inventors: Isao Ishimoda, Kokubunji (JP); Yasuyuki Hara, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 25 days.

(21) Appl. No.: 15/318,961

(22) PCT Filed: Jun. 8, 2015

(86) PCT No.: PCT/JP2015/066444
§ 371 (c)(1),
(2) Date: Dec. 14, 2016

(87) PCT Pub. No.: WO2015/194409
PCT Pub. Date: Dec. 23, 2015

(65) Prior Publication Data
US 2017/0153442 A1 Jun. 1, 2017

(30) Foreign Application Priority Data
Jun. 18, 2014 (JP) .................................. 2014-124934

(51) Int. Cl.
*G02B 25/00* (2006.01)
*G02B 7/02* (2006.01)
*G02B 7/10* (2006.01)

(52) U.S. Cl.
CPC .......... *G02B 25/005* (2013.01); *G02B 7/021* (2013.01); *G02B 7/026* (2013.01); *G02B 7/10* (2013.01);
(Continued)

(58) Field of Classification Search
CPC .. G02B 25/002; G02B 25/004; G02B 25/005; G02B 25/007; G02B 25/008; G02B 7/10;
(Continued)

(56) References Cited

U.S. PATENT DOCUMENTS 4,273,423 A * 6/1981 Uesugi ................... G02B 15/22
352/91 R
5,294,954 A * 3/1994 Nomura .................. G02B 7/04
359/511
(Continued)

FOREIGN PATENT DOCUMENTS

| JP | 59-194712 | 12/1984 |
| JP | 11-305106 | 11/1999 |
| JP | 2008-3258 | 1/2008 |

OTHER PUBLICATIONS

Machine English language translation of "Lens Barrel," J. Tanaka, JP 2008-003258 (of record).*
(Continued)

*Primary Examiner* — Marin Pichler
(74) *Attorney, Agent, or Firm* — Cozen O'Connor

(57) ABSTRACT

Lens barrel includes: a rotating barrel which holds a first optical system and includes an adjustment member that can protrude from an inner circumferential surface; and a fixed barrel which holds a second optical system and includes a helical groove with which the adjustment member engages on an outer circumferential surface. The adjustment member can be located in a first or a second position with respect to the helical groove. Part of the adjustment member is in the helical groove in any of the first position and the second position. When in the first position, the adjustment member can slide along the helical groove, so the rotating barrel helically rotates relative to the fixed barrel, and when in the second position, the adjustment member is in contact with
(Continued)

the helical groove, to prevent rotation of the rotating barrel with respect to the fixed barrel.

20 Claims, 8 Drawing Sheets

(52) U.S. Cl.
CPC ......... *G02B 25/004* (2013.01); *G02B 25/008* (2013.01)

(58) Field of Classification Search
CPC ........ G02B 7/021; G02B 7/022; G02B 7/023; G02B 7/026; G02B 3/00
USPC ........ 359/825, 822, 823, 694, 699–702, 704
See application file for complete search history.

(56) References Cited

U.S. PATENT DOCUMENTS

| | | |
|---|---|---|
| 6,704,142 B2 | 3/2004 | Caplan et al. |
| 2001/0001249 A1* | 5/2001 | Caplan .................. G02B 7/002 359/418 |

OTHER PUBLICATIONS

Office Action dated Sep. 14, 2018 issued in Japanese Patent Application No. 2016-529249.

* cited by examiner

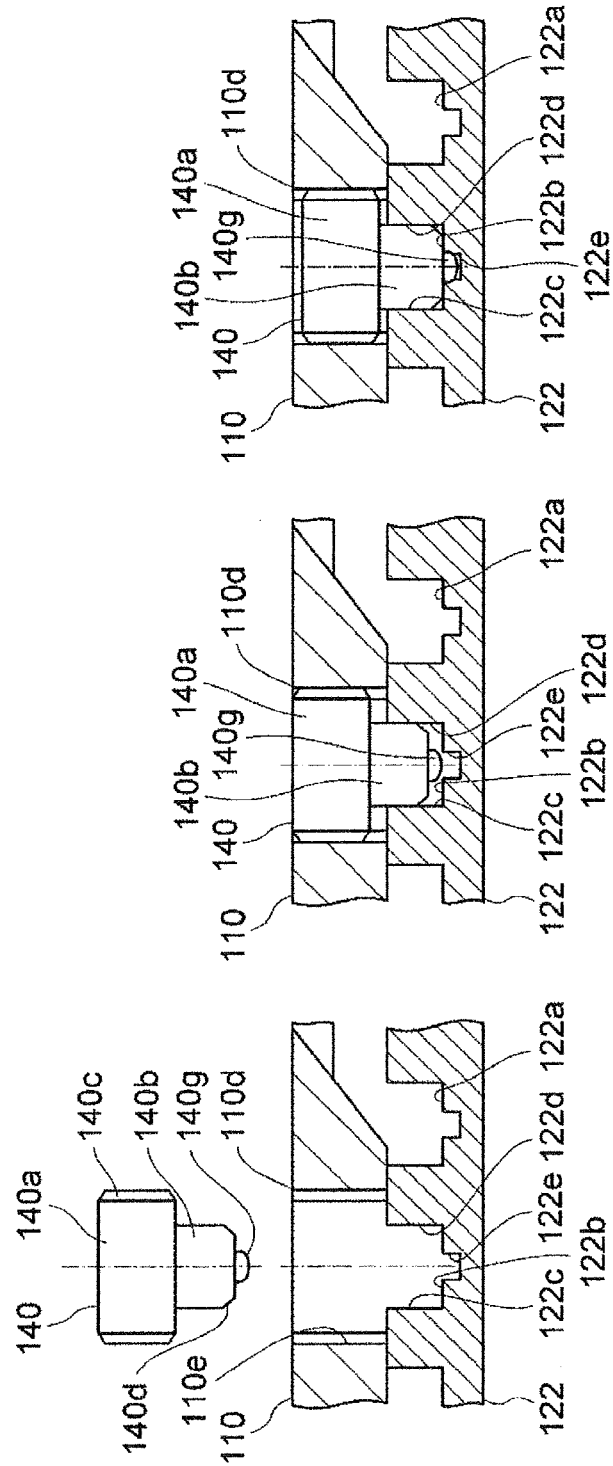

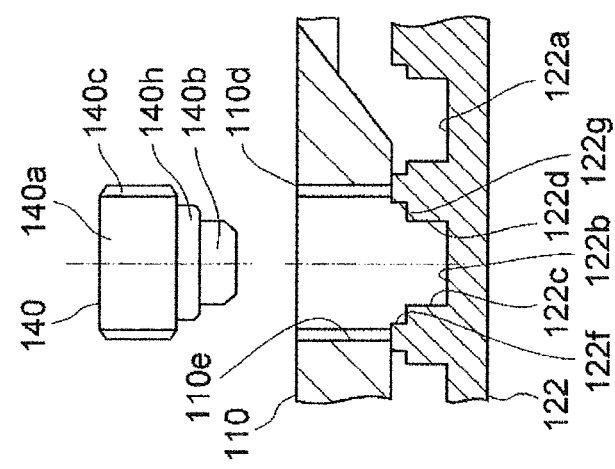
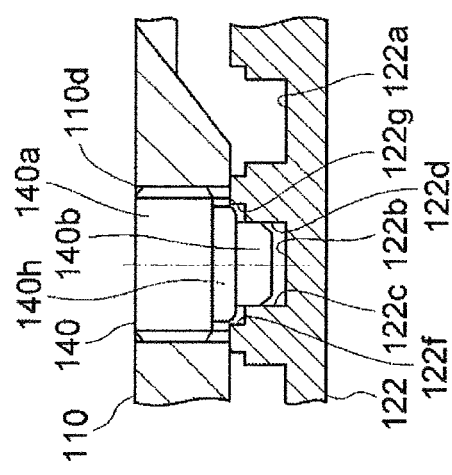
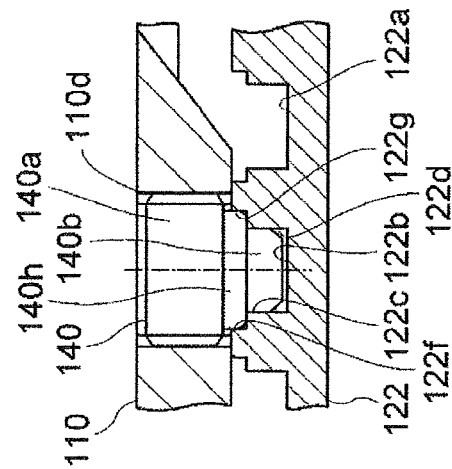

LENS BARREL AND LOUPE

RELATED APPLICATIONS

This is a U.S. National Phase Application under 35 USC 371 of International Application PCT/JP2015/066444 filed on Jun. 8, 2015.

This application claims the priority of Japanese application no. 2014-124934 filed Jun. 18, 2014, the entire content of which is hereby incorporated by reference.

TECHNICAL FIELD

The present invention relates to a lens barrel, and in particular to a lens barrel that holds a plurality of optical systems and a loupe that uses the lens barrel.

BACKGROUND ART

For example, glasses-type loupe is known which is worn by a surgeon or a dentist (a medical doctor or the like) to enlarge an affected area where the medical doctor or the like performs surgery. By the way, there is an individual difference in a distance (a working distance) from a worn loupe to a subject which is an affected area, so that it is necessary to adjust the loupe so that focus is adjusted at a working distance suitable to the medical doctor or the like who uses the loupe. Patent Literature 1 discloses a loupe that can adjust such a working distance.

A specific adjustment method of the working distance in Patent Literature 1 is as follows. A rotating barrel that holds an objective lens is screwed with a fixed barrel that holds other lenses including an eye lens around an optical axis, an axial distance between the objective lens and the other lenses is changed according to a phase angle of the rotating barrel with respect to the fixed barrel, and thereby the working distance is adjusted.

CITATION LIST

Patent Literature

Patent Literature 1: U.S. Pat. No. 6,704,142

SUMMARY OF INVENTION

Technical Problem

By the way, the working distance of the loupe is unique for a medical doctor or the like, and once the working distance is adjusted, the working distance is rarely changed thereafter, so that the rotating barrel and the fixed barrel are fixed together in general after the adjustment by using an adhesive member or a fixing member. Therefore, in the method in which the rotating barrel and the fixed barrel are fixed together, if by any chance the adjustment is performed with an erroneous working distance, the rotating barrel and the fixed barrel cannot be separated from each other, so that these barrels have to be discarded. Therefore, the yield of the method is low. On the other hand, in a method in which the rotating barrel and the fixed barrel are fixed together by using a separate fixing member that fixes together the rotating barrel and the fixed barrel from outside, the number of components is increased and a space has to be provided in which the fixing member is attached to the rotating barrel and the fixed barrel, and further, the size and the weight of the loupe are increased by attaching the fixing member. Therefore, the method is not preferable.

The present invention is to solve the above problem and an object of the present invention is to provide a lens barrel that can arbitrarily adjust the working distance despite having a light, simple, and small structure, and a loupe that uses the lens barrel.

Solution to Problem

To realize one of the above objects, a lens barrel reflecting one aspect of the present invention is a lens barrel including:

a rotating barrel which holds a first optical system and includes an adjustment member that can protrude from an inner circumferential surface;

a fixed barrel which holds a second optical system and includes a helical groove with which the adjustment member engages on an outer circumferential surface, wherein the adjustment member can be located in a first position or a second position with respect to the helical groove and a part of the adjustment member is in the helical groove in any of the first position and the second position, when the adjustment member is in the first position, the adjustment member can slidably move along the helical groove, and thereby the rotating barrel relatively helically rotates with respect to the fixed barrel, and when the adjustment member is in the second position, the adjustment member is in contact with the helical groove, and thereby rotation of the rotating barrel with respect to the fixed barrel is prevented.

According to the lens barrel, when the adjustment member is located in the first position, the adjustment member and the helical groove can slidably move with respect to each other. Therefore, the rotating barrel relatively helically rotates with respect to the fixed barrel while being guided by the helical groove through the adjustment member. Accordingly, the axial distance between the first optical system and the second optical system accurately varies, so that it is possible to easily set a desired working distance. When the adjustment member is located in the second position, the adjustment member is fixed to the helical groove. Thereby, rotation of the rotating barrel with respect to the fixed barrel is prevented. Therefore, after setting the working distance, it is possible to easily fix the rotating barrel to the fixed barrel without using adhesive or a separate fixing member. Further, if by any chance it is necessary to set the working distance again, it is possible to relatively helically rotate the rotating barrel with respect to the fixed barrel by returning the adjustment member to the first position.

The loupe is characterized by having the lens barrel described above.

Advantageous Effects of Invention

According to the present invention, it is possible to provide a lens barrel that can arbitrarily adjust the working distance despite having a light, simple, and small structure, and a loupe that uses the lens barrel.

BRIEF DESCRIPTION OF DRAWINGS

FIGS. 8A to 8C are cross-sectional views of an area close to a through-hole 110d in a rotating barrel 110 and a prism holding barrel 122 according to a second embodiment.

FIGS. 9A to 9C are cross-sectional views of an area close to a through-hole 110d in a rotating barrel 110 and a prism holding barrel 122 according to a third embodiment.

DESCRIPTION OF EMBODIMENTS

Figure 1:
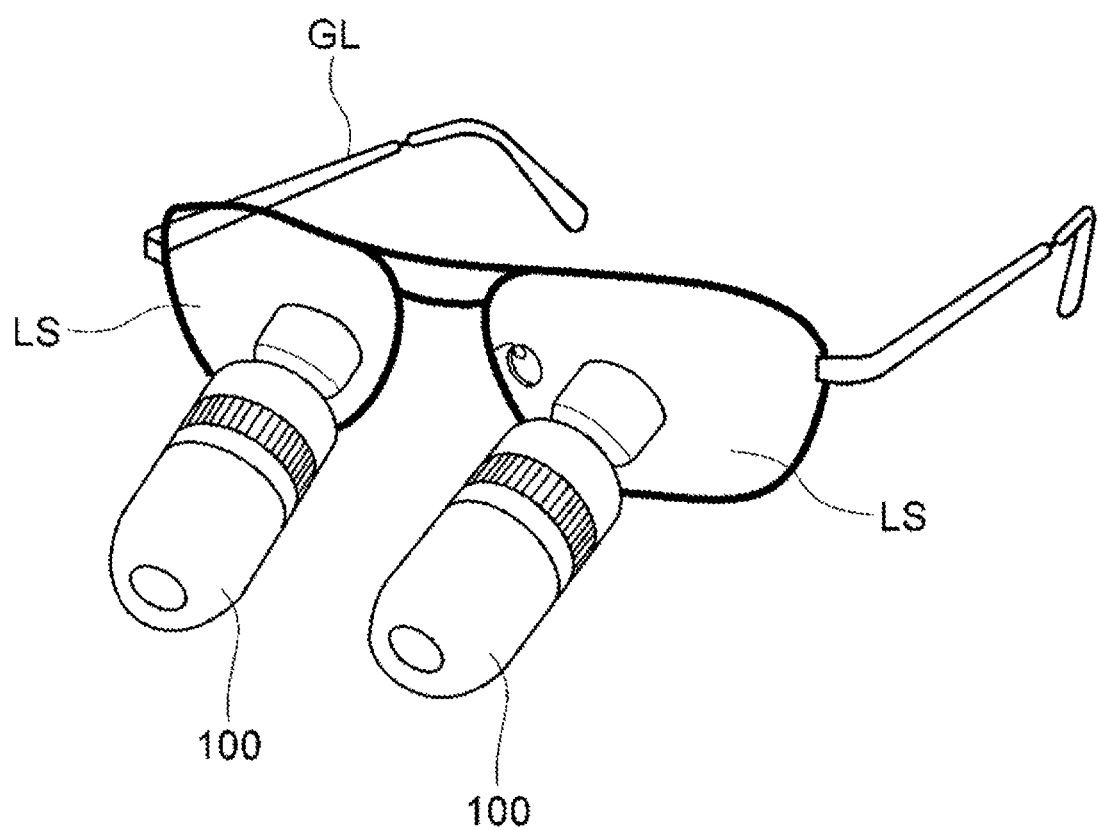
FIG. 1 is an external perspective view of glasses where loupes each of which includes a lens barrel according to embodiments are attached.

Hereinafter, embodiments of the present invention will be described with reference to the drawings. FIG. 1 is an external perspective view of glasses where loupes each of which includes a lens barrel according to an embodiment are attached.

As illustrated in FIG. 1, two loupes 100 are respectively attached to lenses LS of glasses GL. When a medical doctor or the like wears the glasses GL on his or her face during an operation, the loupes 100 are located in front of the pupils of the eyes. Thereby, the medical doctor or the like can enlarge and observe an affected area. The two loupes have the same configuration, so that only one loupe 100 will be described hereinafter.

Figure 2:
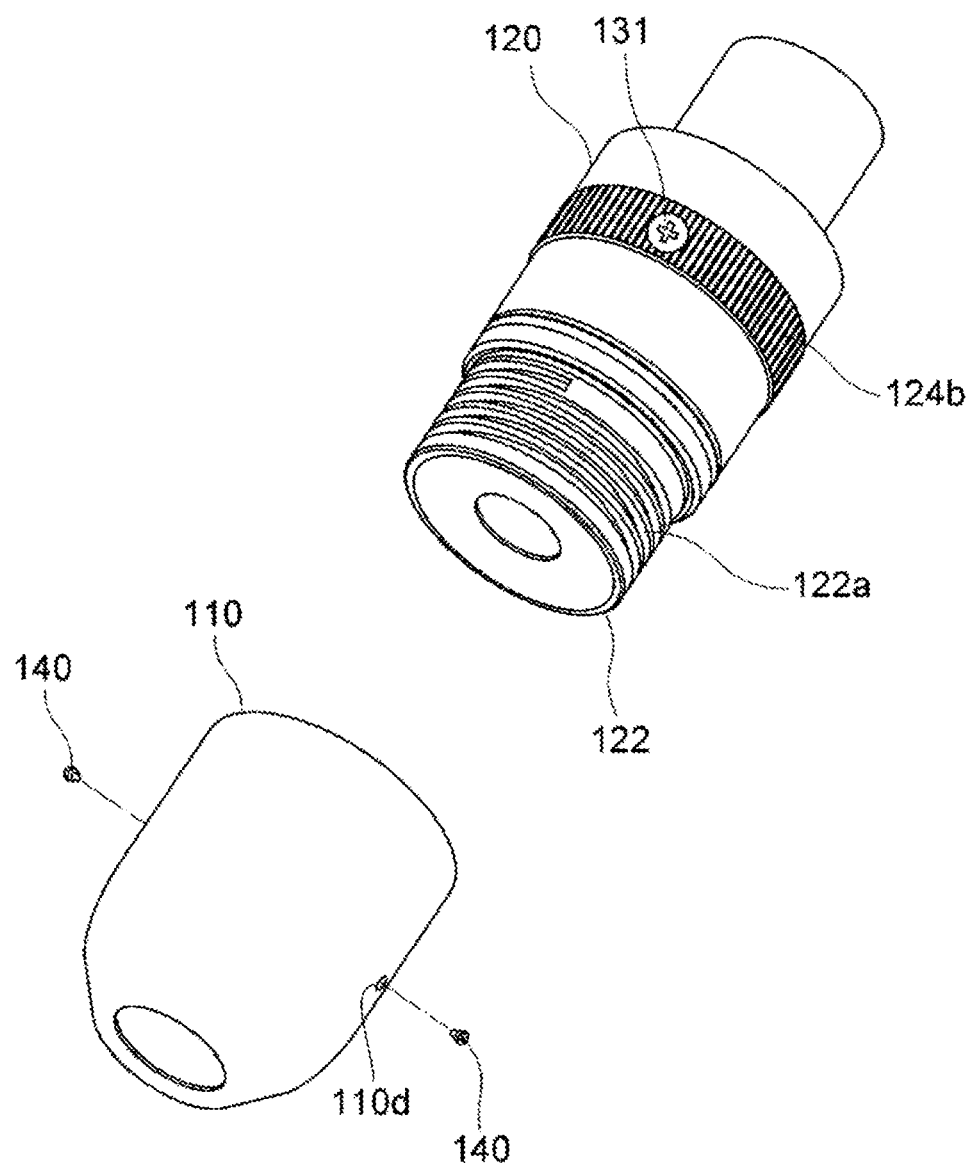
FIG. 2 is a perspective view showing a loupe 100 according to the embodiments in a state in which the loupe 100 is disassembled.

FIG. 2 is a perspective view showing the loupe 100 according to the embodiments in a state in which the loupe 100 is disassembled. As illustrated in FIG. 2, the loupe 100 includes a rotating barrel 110 and a fixed unit (a fixed barrel) 120. An adjustment member 140 can be attached to the rotating barrel 110.

Figure 3:
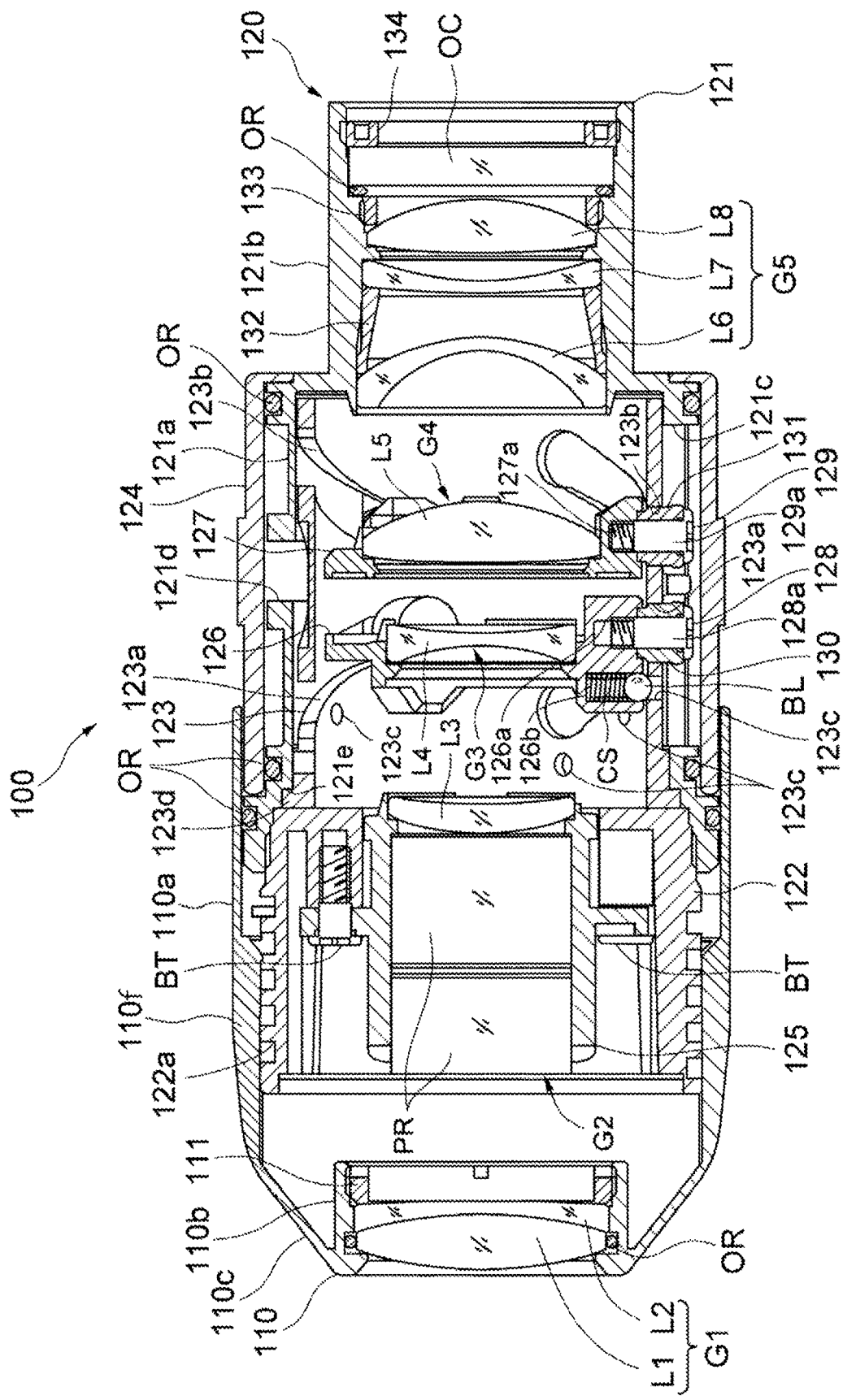
FIG. 3 is an optical axis direction cross-sectional view of a loupe 100 according to a first embodiment.
Figure 4:
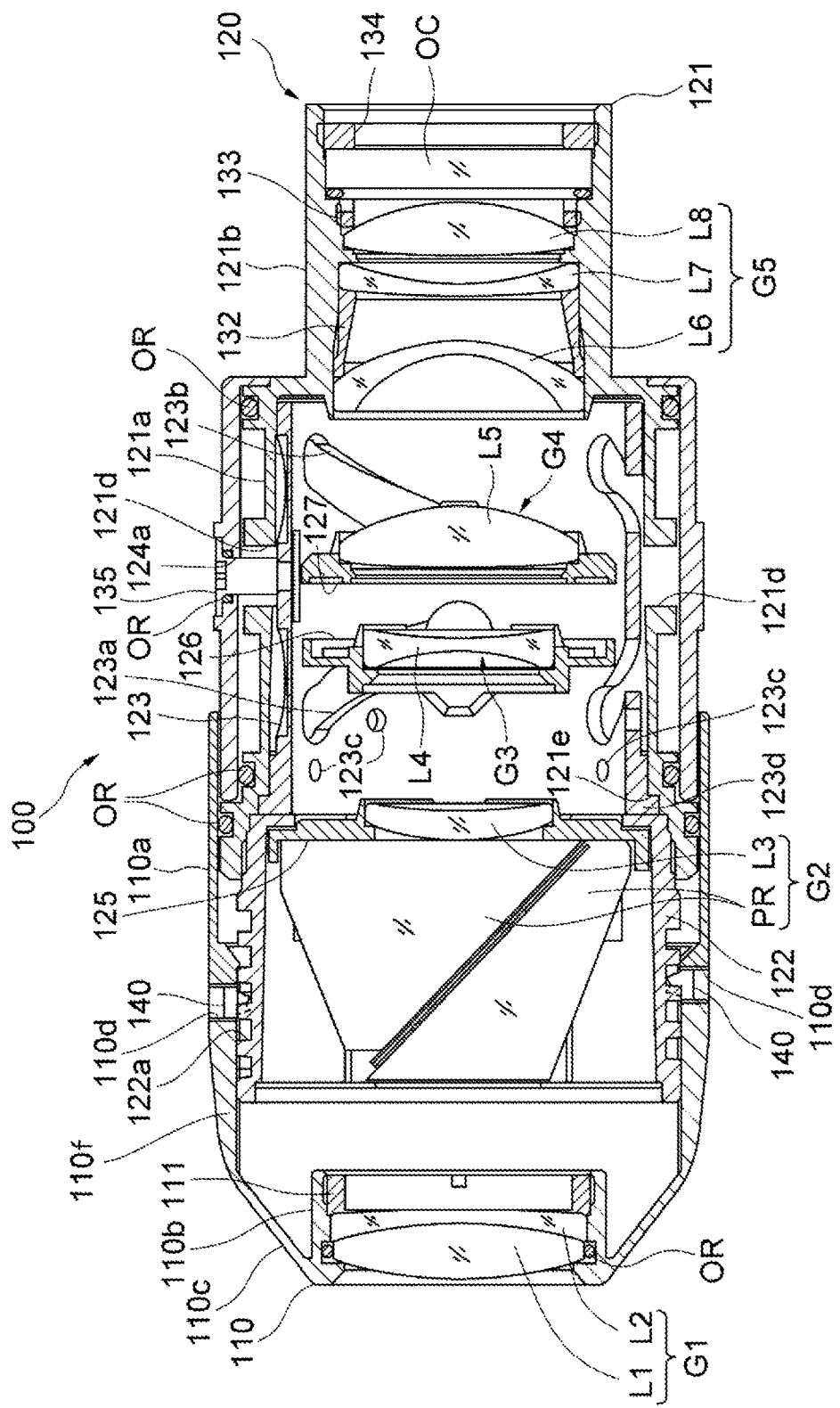
FIG. 4 is an optical axis direction cross-sectional view of the loupe 100 according to the first embodiment.

FIGS. 3 and 4 are optical axis direction cross-sectional views of the loupe 100 according to a first embodiment. The cross sections in FIGS. 3 and 4 are perpendicular to each other. In FIGS. 3 and 4, the rotating barrel 110 made from thin metal is integrally formed of a large cylindrical portion 110a, a small cylindrical portion 110b included in the large cylindrical portion 110a, and a taper portion 110c that connects end portions of the large cylindrical portion 110a and the small cylindrical portion 110b. Lenses L1 and L2 that form a first lens group G1 are arranged in the small cylindrical portion 110b, and the lenses L1 and L2 are fixed to the small cylindrical portion 110b by a ring-shaped fixing member 111. An O-ring OR is arranged around the lens L1 which is closest to a subject. The O-ring OR seals between the lens L1 and the small cylindrical portion 110b in a dustproof and waterproof manner.

As illustrated in FIG. 4, a through-hole 110d is formed in two positions facing each other in the large cylindrical portion 110a. The through-hole 110d has a female screw on its inner circumference. The adjustment member 140 has a male screw on its outer circumference. The adjustment member 140 is attached to the rotating barrel 110 by causing both screws to be screwed together.

The fixed unit 120 includes a main fixed barrel 121, a prism holding barrel 122 connected to the subject side of the main fixed barrel 121, a cam barrel 123 arranged inside the main fixed barrel 121, and an operation ring 124 arranged inside the main fixed barrel 121.

The prism holding barrel 122 having a substantially cylindrical shape fixes a Keplerian prism PR for securing an erected image and a holding frame 125 that holds a lens L3 inside the prism holding barrel 122 by a bolt BT (FIG. 3). The prism PR and the lens L3 form a second lens group G2. A helical groove 122a is formed on the outer circumference of the prism holding barrel 122. A tip of the adjustment member 140 is in contact with the helical groove 122a. Although not illustrated in the drawings, a concave portion with which a tool such as a driver can be engaged is formed on the top surface of the adjustment member 140. A relationship between the adjustment member 140 and the helical groove 122a will be described later.

Inside the cam barrel 123, a holding frame 126 that holds a lens L4 that is a third lens group G3 and a holding frame 127 that holds a lens L5 that is a fourth lens group G4 are displaceably arranged in the optical axis direction. The cam barrel 123 includes two cam grooves 123a and 123b extending in a circumferential direction and also includes circular openings 123c at predetermined intervals along the cam groove 123a.

An end portion of a screw 128 having a cylindrical shaft 128a with a flange is screwed into each of three screw holes 126a (only one screw hole 126a is illustrated) formed in the outer circumference of the holding frame 126. A roller 130 rotatably fitted to the cylindrical shaft 128a is fitted into the cam groove 123a of the cam barrel 123 and can be rotated along the cam groove 123a.

Further, a bottomed hole 126b is provided adjacent to one screw hole 126a of the holding frame 126. A coil spring CS and a ball BL are arranged in the bottomed hole 126b. The ball BL is urged outward in the radial direction by an urging force of the coil spring CS. The position of the circular opening 123c corresponds to the position of the ball BL that is relatively rotated.

An end portion of a screw 129 having a cylindrical shaft 129a with a flange is screwed into each of three screw holes 127a (only one screw hole 127a is illustrated) formed in the outer circumference of the holding frame 127. A roller 131 rotatably fitted to the cylindrical shaft 129a is fitted into the cam groove 123b of the cam barrel 123 and can be rotated along the cam groove 123b.

The main fixed barrel 121 has a shape in which a large cylindrical portion 121a and a small cylindrical portion 121b are directly connected. A straight groove 121c (FIG. 3) extending in an axial direction is formed inside the large cylindrical portion 121a whose end portion is connected to the prism holding barrel 122. Head portions of the screws 128 and 129 and the rollers 130 and 131 are relatively movably engaged with the straight groove 121c. Thereby, the holding frames 126 and 127 can be displaced only along the straight groove 121c (that is, cannot be rotated).

The cam barrel 123 is relatively rotatably arranged inside the large cylindrical portion 121a and the operation ring 124 is relatively rotatably arranged outside the large cylindrical portion 121a. In FIG. 4, an opening 124a is formed at the center of the operation ring 124. A shoulder screw 135 inserted into the opening 124a penetrates a circumferential direction groove 121d formed in the large cylindrical portion 121a, is screwed with the outer circumference of the cam barrel 123, and causes a thick shaft portion to be in contact with the outer circumference of the cam barrel 123. Thereby, the operation ring 124 and the cam barrel 123 rotate in an integrated manner. However, an annular portion 123d facing outward in the radial direction at an end portion of the cam barrel 123 is housed in an annular space formed between an annular recessed portion 121e formed at an end portion of the large cylindrical portion 121a and an end portion of the prism holding barrel 122, so that the cam barrel 123 and the operation ring 124 cannot be displaced with respect to the main fixed barrel 121 in the optical axis direction. Outer circumferences of end portions of the large cylindrical portion 121a and the operation ring 124 are surrounded by an end portion of the large cylindrical portion 110a of the rotating barrel 110.

An O-ring OR is arranged between the shoulder screw 135 and the opening 124a. Further, an O-ring OR is arranged between the rotating barrel 110 and the large cylindrical portion 121a. Furthermore, an O-ring OR is arranged between one ends of the large cylindrical portion 121a and the operation ring 124 and between the other ends of these. The O-rings OR seal between the above portions in a dustproof and waterproof manner. Further, as illustrated in FIG. 2, a straight knurl 124b having a periodic protruded/recessed shape is formed on the outer circumference of the operation ring 124 as a slip resistance during operation.

In the small cylindrical portion 121b of the main fixed barrel 121, lenses L6, L7, and L8 included in a fifth lens group G5 are fixed through ring-shaped fixing members 132 and 133. In the small cylindrical portion 121b, an eye lens OC is fixed adjacent to the fifth lens group G5 by a ring-shaped fixing member 134. An O-ring OR is arranged between the small cylindrical portion 121b and the eye lens OC. The O-ring OR seals between the small cylindrical portion 121b and the eye lens OC in a dustproof and waterproof manner. The first lens group G1 is defined as a first optical system and the lens groups G2 to G5 are defined as a second optical system.

Figure 5:
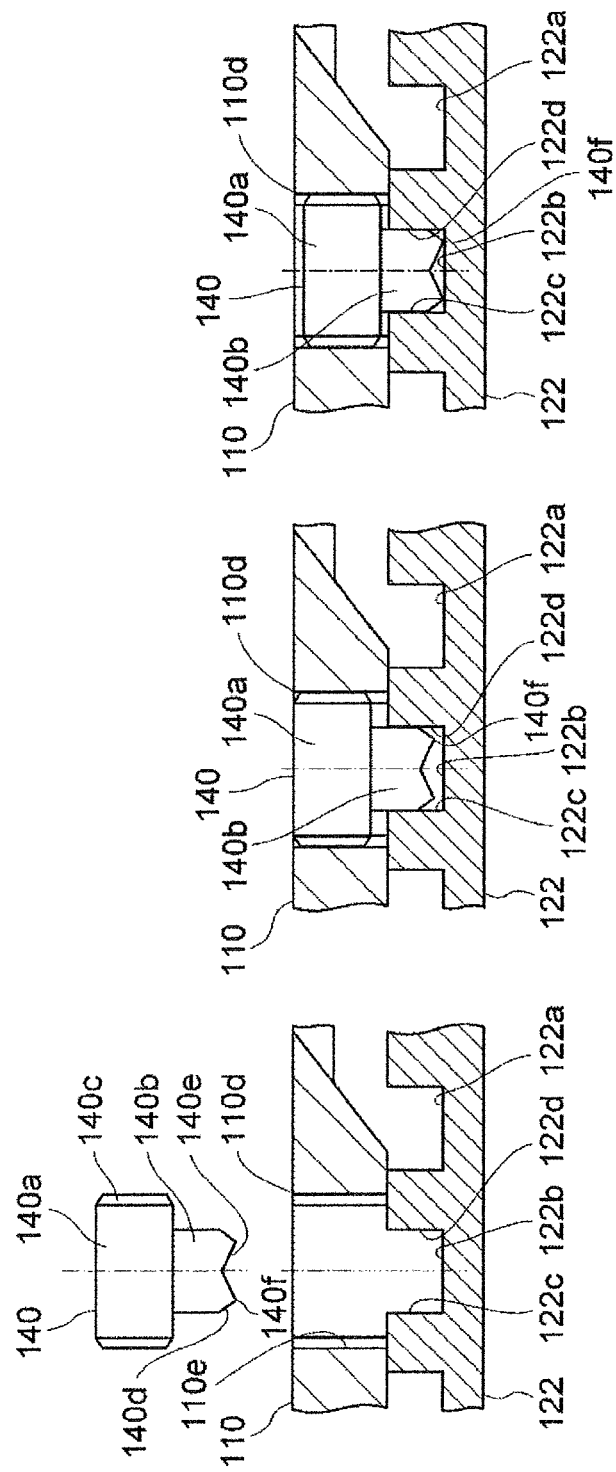
FIGS. 5A to 5C are cross-sectional views of an area close to a through-hole 110d in a rotating barrel 110 and a prism holding barrel 122.

FIG. 5 is a cross-sectional view of an area close to the through-hole 110d in the rotating barrel 110 and the prism holding barrel 122. The area is illustrated along with the adjustment member 140. In FIG. 5A that illustrates a disassembled state, the adjustment member 140 has a configuration in which a first cylindrical portion 140a and a second cylindrical portion 140b whose diameter is smaller than that of the first cylindrical portion 140a are connected in series. A male screw 140c is formed on the outer circumference of the first cylindrical portion 140a. On the other hand, an end portion of the second cylindrical portion 140b, which is the tip side, forms an outer taper surface 140d whose diameter decreases as being closer to the tip and an inner taper surface 140e whose diameter increases as being closer to the tip. That is to say, the end portion of the second cylindrical portion 140b has a sharp annular portion 140f. On the other hand, a female screw 110e is formed on an inner circumference of the through-hole 110d.

The helical groove 122a of the prism holding barrel 122 has a bottom surface 122b and a pair of side surfaces 122c and 122d. The side surfaces 122c and 122d are perpendicular to the bottom surface 122b. The outer diameter of the second cylindrical portion 140b is substantially the same as a gap between the side surfaces 122c and 122d.

Next, an operation to adjust the loupe 100 will be described. In FIG. 2, when the large cylindrical portion 110a of the rotating barrel 110 is inserted into the fixed unit 120 along the optical axis direction (for example, in a linear manner), a cylindrical inner circumferential surface of a thick wall portion 110f (FIG. 4) formed so as to protrude inside the large cylindrical portion 110a is fitted to an outer circumferential surface of the helical groove 122a of the prism holding barrel 122 without play. Thereby, an axis line of the rotating barrel 110 and an axis line of the fixed unit 120 are coincident with each other. The rotating barrel 110 is inserted to a predetermined position with respect to the fixed unit 120, and then the male screw 140c of the adjustment member 140 is screwed and installed into each of two female screws 110e of the through-hole 110d of the rotating barrel 110. However, in a state in which the working distance has not been adjusted, as illustrated in FIG. 5B, regarding the installation position, although the second cylindrical portion 140b of the adjustment member 140 is inserted into the helical groove 122a of the prism holding barrel 122, the front end annular portion 140f does not come into contact with the bottom surface 122b. The above position is referred to as a first position. In this state, the amount of protrusion of the second cylindrical portion 140b of the adjustment member 140 is relatively small. That is to say, the contact area between the adjustment member 140 and the helical groove 122a is relatively small. When the adjustment member 140 is located at the first position, the outer circumference of the second cylindrical portion 140b of the adjustment member 140 enters into the helical groove 122a of the prism holding barrel 122 and comes into relatively slidably contact with the side surfaces 122c and 122d. However, the tip of the adjustment member 140 is not in contact with the bottom surface 122b. Therefore, the adjustment member 140 is guided along the side surfaces 122c and 122d. In FIG. 5B, the top surface of the adjustment member 140 is flush with the outer circumferential surface of the rotating barrel 110. In the first position, when the second cylindrical portion 140b enters inside the helical groove 122a, if the outer circumference of the second cylindrical portion 140b is not in contact with the side surfaces 122c and 122d of the helical groove 122a, resistance during the adjustment is small and the adjustment can be smoothly performed. However, as illustrated in FIG. 5B, when the outer circumference of the second cylindrical portion 140b is in contact with the side surfaces 122c and 122d of the helical groove 122a, the loupe can be adjusted without play, so that it is preferable.

It is possible to adjust the amount of extension of the rotating barrel 110 with respect to the fixed unit 120 by rotating and screwing the rotating barrel 110 relatively with respect to the fixed unit 120 in a state in which the adjustment member 140 is held in the first position. Thereby, an axial distance between the lens group G1 and the lens group G2 to G5 is varied, so that it is possible to set a desired working distance. When a desired working distance is set, as illustrated in FIG. 5C, the adjustment member 140 is further screwed onto the fixed unit 120 by a tool not illustrated in the drawings. Thereby, the sharp annular portion 140f at the tip of the adjustment member 140 comes into contact with and cuts into the bottom surface 122b of the helical groove 122a. This position is referred to as a second position. Thereby, a pressing force (a frictional force) applied between the adjustment member 140 and the helical groove 122a in the second position is greater than a pressing force (a frictional force) applied between the adjustment member 140 and the helical groove 122a in the first position. Therefore, it is possible to reliably fix the rotating barrel 110 to the fixed unit 120. It is possible to sharpen the center of the tip of the adjustment member 140. However, in such a structure, a fixing force is insufficient when the amount of cutting into the bottom surface 122b is small in the second position. Therefore, there is a risk to allow the rotating barrel 110 to rotate. Further, there is a risk to scar the bottom surface 122b of the helical groove 122a by dragging the sharp tip when the rotating barrel rotates. On the other hand, according to the annular portion 140f, there are no such risks, so that it is preferable. The relationship between the rotating barrel and the fixed barrel means that one barrel rotates with respect to the other barrel. Therefore, for example, the adjustment member may be provided in a barrel that is fixed and the helical groove may be provided in a barrel that rotates.

When setting the working distance again, it is possible to relatively helically rotate the rotating barrel 110 with respect to the fixed unit 120 by returning the adjustment member 140 to the first position by rotating the adjustment member 140 in the inverse direction by using a tool not illustrated in the drawings.

When a user wears the glasses GL, the user can enlarge and observe a subject through the lens groups G1 to G5 in the loupe 100. On the other hand, when the user wants to change magnification of the subject, by rotating the operation ring 124, the cam barrel 123 is rotated. Thereby, the screws 128 and 129 receive a torque rotating in the same direction from the cam grooves 123a and 123b. However, the rotation of the screws 128 and 129 is prevented by the straight groove 121c, so that the screws 128 and 129 displace the holding frame 126 in an optical axis direction and displace the holding frame 127 in the opposite direction of the optical axis direction while relatively moving along the cam grooves 123b and 123c. Thereby, it is possible to change magnification by changing the gap between the third lens group G3 and the fourth lens group G4. At this time, every time the ball BL engages with one of the circular openings 123c of the cam barrel 123, resistance is given to fingers of the user who operates the operation ring 124 and a so-called click feeling is given to the user. Therefore, the user can sensuously recognize the degree of variation of magnification.

Figure 6:
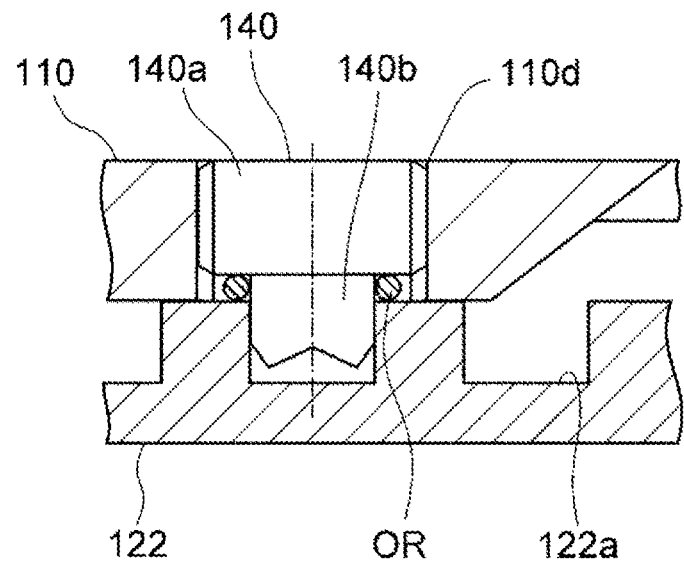
FIG. 6 is a cross-sectional view of an area similar to that in FIG. 5B according to a modified example of the embodiment.

FIG. 6 is a cross-sectional view of an area similar to that in FIG. 5B according to a modified example of the embodiment. In the modified example of FIG. 7, a difference from the embodiment described above is that an O-ring OR, which is a resistance means, is arranged around an end portion of the second cylindrical portion 140b, which faces the first cylindrical portion 140a, of the adjustment member 140. In a first position illustrated in FIG. 6, the O-ring OR is slightly in contact with the first cylindrical portion 140a. From the above state, when the adjustment member 140 is screwed in, the O-ring is squeezed and deformed between the first cylindrical portion 140a and the outer circumferential surface of the prism holding barrel 122 around the helical groove 122a, so that the O-ring provides a predetermined resistance. In summary, when an operator screws in the adjustment member 140 by using a tool not illustrated in the drawings, the operator can know that the adjustment member 140 is close to the second position by sensing the predetermined resistance through the tool. A coned disk spring or the like can be used instead of the O-ring.

Figure 7:
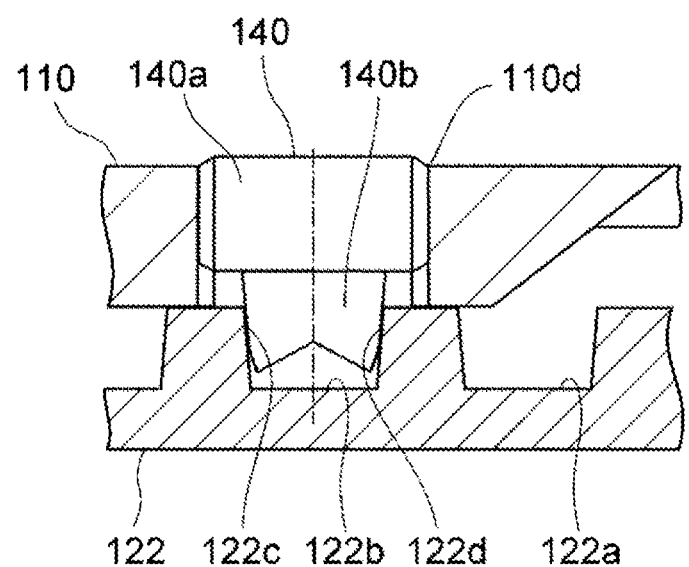
FIG. 7 is a cross-sectional view of an area similar to that in FIG. 5B according to another modified example of the embodiment.

FIG. 7 is a cross-sectional view of an area similar to that in FIG. 5B according to another modified example of the embodiment. In the modified example of FIG. 7, a difference from the embodiment described above is that the side surfaces 122c and 122d of the helical groove 122a are tilted with respect to the bottom surface 122b. That is, the side surfaces 122c and 122d are inclined surfaces, the distance between which increases as the distance from the bottom surface 122b increases. Further, the second cylindrical portion 140b of the adjustment member 140 has a conical taper surface corresponding to the side surfaces 122c and 122d. Thereby, the movement of the adjustment member 140 during adjustment is as smooth as that of cam pin. Further, for example, when forming the prism holding barrel 122 by injection molding from a mold by using resin, it is preferable because releasability of the helical groove is improved. Also in the modified example described above, in the first position, in the same manner as in the embodiment described above, the outer circumference of the second cylindrical portion 140b of the adjustment member 140 comes into contact with the side surfaces 122c and 122d and can relatively slidably move with respect to the side surfaces 122c and 122d.

FIG. 8 is cross-sectional views of an area close to the through-hole 110d in the rotating barrel 110 and the prism holding barrel 122 according to a second embodiment. The area is illustrated along with the adjustment member 140. In the embodiment of FIG. 8, a difference from the embodiment described above is that a hemispherical protrusion 140g is formed instead of providing the inner taper surface at the center of the tip of the second cylindrical portion 140b and accordingly a small groove 122e extending along the helical groove 122a is formed at the center of the bottom surface 122b of the helical groove 122a. The width of the small groove 122e is smaller than the maximum diameter of the protrusion 140g.

In a first position illustrated in FIG. 8B, in the same manner as in the embodiment described above, the outer circumference of the second cylindrical portion 140b of the adjustment member 140 comes into contact with the side surfaces 122c and 122d and can relatively slidably move with respect to the side surfaces 122c and 122d. At this time, the protrusion 140g is away from the small groove 122e. On the other hand, in a second position illustrated in FIG. 8C, the protrusion 140g is inserted into (fitted into) the small groove 122e by further screwing in the adjustment member 140, so that the protrusion 140g deforms and expands the small groove 122e. Thereby, it is possible to reliably fix the rotating barrel 110 to the fixed unit 120. At this time, a tip plane around the protrusion 140g of the second cylindrical portion 140b comes into contact with the bottom surface 122b of the helical groove 122a, so that further screwing-in of the adjustment member 140 is avoided. Therefore, it is possible to avoid damage of the helical groove 122a.

FIG. 9 is cross-sectional views of an area close to the through-hole 110d in the rotating barrel 110 and the prism holding barrel 122 according to a third embodiment. The area is illustrated along with the adjustment member 140. In the embodiment of FIG. 9, a difference from the embodiment described above is that a third cylindrical portion 140h is formed between the first cylindrical portion 140a and the second cylindrical portion 140b. The outer diameter of the third cylindrical portion 140h (referred to as a large diameter portion) is smaller than the outer diameter of the first cylindrical portion 140a and is greater than the outer diameter of the second cylindrical portion 140b (referred to as a small diameter portion). The tip of the second cylindrical portion 140b is a plane. A pair of side walls 122f and 122g are formed on both sides of the helical groove 122a on the outer circumferential surface of the prism holding barrel 122. The side walls 122f and 122g helically extend along the helical groove 122a.

In a first position illustrated in FIG. 9B, in the same manner as in the embodiment described above, the outer circumference of the second cylindrical portion 140b of the adjustment member 140 comes into contact with the side surfaces 122c and 122d and can relatively slidably move with respect to the side surfaces 122c and 122d. At this time, the third cylindrical portion 140h is away from the side walls 122f and 122g. On the other hand, in a second position illustrated in FIG. 9C, the third cylindrical portion 140h enters between the side walls 122f and 122g and presses the side walls 122f and 122g by further screwing in the adjustment member 140. Thereby, it is possible to reliably fix the rotating barrel 110 to the fixed unit 120.

Hereinafter, preferred aspects of the lens barrel will be collectively described.

It is preferred that the rotating barrel has a through-hole and the adjustment member is a cylindrical member inserted into the through-hole. Thereby, it is possible to displace between the first position and the second position by operating the cylindrical member inserted into the through-hole from the outside.

It is preferred that the through-hole has a female screw, the adjustment member has a male screw that is screwed with the female screw, and the adjustment member is displaced from the first position to the second position by rotating the adjustment member with respect to the through-hole. When the male screw of the adjustment member is screwed with the female screw of the through-hole, by rotating the adjustment member with respect to the through-hole, it is possible to correctly displace the adjustment member from the first position to the second position and further it is possible to prevent the rotating barrel from relatively helically rotating unexpectedly with respect to the fixed barrel because the adjustment member remains in the second position with a strong frictional force applied between both screws.

It is preferred that a pressing force between the adjustment member and the helical groove when the adjustment member is located in the first position is smaller than a pressing force between the adjustment member and the helical groove when the adjustment member is located in the second position. By changing the pressing force between the adjustment member and the helical groove in this way, it is possible to cause the adjustment member to slidably move with respect to the helical groove when the adjustment member is located in the first position and it is possible to cause the adjustment member to be fixed to the helical groove when the adjustment member is located in the second position.

It is preferred that the helical groove has a bottom surface and a side surface, the adjustment member has a tip facing the bottom surface and a circumferential surface facing the side surface, the circumferential surface is relatively movably in contact with the side surface when the adjustment member is located in the first position, and the tip is relatively immovably in contact with the bottom surface when the adjustment member is located in the second position. When the adjustment member is located in the first position, the circumferential surface is relatively movably in contact with the side surface, so that the helical groove has a function of a cam groove and the adjustment member has a function of a cam follower, and thereby it is possible to accurately guide the rotating barrel along the helical groove. On the other hand, when the adjustment member is located in the second position, the tip is relatively immovably in contact with the bottom surface, so that it is possible to reliably fix the rotating barrel to the fixed barrel.

It is preferred that the side surface of the helical groove has a taper shape and the circumferential surface of the adjustment member has a taper shape corresponding to the side surface having the taper shape. Thereby, the adjustment member is moved smoothly during adjustment.

It is preferred that a ring-shaped raised portion is formed on the tip of the adjustment member. When the adjustment member is located in the second position, the ring-shaped raised portion cuts into the bottom surface of the helical groove, so that it is possible to reliably fix the rotating barrel to the fixed barrel. The center of the tip of the adjustment member may be sharpened.

It is preferred that the helical groove has a bottom surface including a small groove extending along the helical groove and a side surface, the adjustment member has a tip where a protrusion is formed which faces the small groove and which is greater than the width of the small groove and a circumferential surface facing the side surface, the circumferential surface is relatively movably in contact with the side surface when the adjustment member is located in the first position, and the protrusion is fitted into the small groove to fix the circumferential surface and the side surface to be relatively immovable when the adjustment member is located in the second position. When the adjustment member is located in the first position, the circumferential surface is relatively movably in contact with the side surface, so that the helical groove has a function of a cam groove and the adjustment member has a function of a cam follower, and thereby it is possible to accurately guide the rotating barrel along the helical groove. On the other hand, when the adjustment member is located in the second position, the protrusion is fitted into the small groove to fix the circumferential surface and the side surface to be relatively immovable, so that it is possible to reliably fix the rotating barrel to the fixed barrel.

It is preferred that the fixed barrel has a pair of side walls extending outside the side surface of the helical groove, the adjustment member has a small diameter portion facing the side surface and a large diameter portion whose diameter is greater than a gap between the side surfaces, the small diameter portion is relatively movably in contact with the side surface when the adjustment member is located in the first position, and the large diameter portion is relatively immovably in contact with the side walls when the adjustment member is located in the second position. When the adjustment member is located in the first position, the small diameter portion is relatively movably in contact with the side surface, so that the helical groove has a function of a cam groove and the adjustment member has a function of a cam follower, and thereby it is possible to accurately guide the rotating barrel along the helical groove. On the other hand, when the adjustment member is located in the second position, the large diameter portion is relatively immovably in contact with the side walls, so that it is possible to reliably fix the rotating barrel to the fixed barrel.

It is preferred that a resistance means which provides a predetermined resistance when the adjustment member is displaced to the second position is formed between the adjustment member and the fixed barrel. When the adjustment member is displaced to the second position, the resistance means provides a predetermined resistance, so that when operating the adjustment member, an operator can recognize that the adjustment member is displaced to the second position by sensing the predetermined resistance. Therefore, it is possible to avoid a problem such as over tightening.

It is preferred that the resistance means is an O-ring. It is possible to simplify the resistance means by using the O-ring.

It is preferred to provide an operation ring by which magnification of a subject can be changed when observing the subject through the first and the second optical systems. Thereby, a user can change the magnification of the subject.

The present invention is not limited to the embodiments described in the description. It is obvious for those skilled in the art that the invention includes other embodiments and modified examples from the embodiments and technical ideas described in the description. The purpose of the description and the embodiments is only to exemplify the invention and the scope of the invention is defined in the claims.

REFERENCE SIGNS LIST

100 Loupe
110 Rotating barrel
110a Large cylindrical portion
110b Small cylindrical portion
110c Taper portion
110d Through-hole
110f Thick wall portion
111 Fixing member
120 Fixed unit
121 Main fixed barrel
121a Large cylindrical portion
121b Small cylindrical portion
121c Straight groove
121d Circumferential direction groove
121e Annular recessed portion
122 Prism holding barrel
122a Helical groove
122b Bottom surface
122c, 122d Side surface
122e Small groove
122f, 122g Side wall
123 Cam barrel
123a Cam groove
123b Cam groove
123c Circular opening
123d Annular portion
124 Operation ring
124a Opening
124b Straight knurl
125 Holding frame
126 Holding frame
126a Hole
126b Bottomed hole
127 Holding frame
127a Hole
128, 129 Screw
128a Cylindrical shaft
129a Cylindrical shaft
130 Roller
131 Roller
132,133 Fixing member
134 Fixing member
140 Adjustment member
140a Cylindrical portion
140b Cylindrical portion
140d Outer taper surface
140e Inner taper surface
140f Annular portion
140g Protrusion
140h Cylindrical portion
BL Ball
BT Bolt
CS Coil spring
G1 Lens group
G1-G5 Lens group
GL Glasses
LS Lens
OC Eye lens
OR Ring
PR Prism

The invention claimed is:

1. A lens barrel comprising:
a rotating barrel which holds a first optical system and includes an adjustment member that can protrude from an inner circumferential surface;
a fixed barrel which holds a second optical system and includes only one helical groove with which the adjustment member engages on an outer circumferential surface,
wherein the adjustment member can be located in a first position or a second position with respect to the helical groove and a part of the adjustment member is in the helical groove in both of the first position and the second position,
when the adjustment member is in the first position, the adjustment member is in slidable contact with the helical groove so it can slidably move along the helical groove, and thereby the rotating barrel relatively helically rotates with respect to the fixed barrel, and
when the adjustment member is in the second position, the adjustment member is in fixed contact with the helical groove, and thereby rotation of the rotating barrel with respect to the fixed barrel is prevented.

2. The lens barrel according to claim 1, wherein the rotating barrel has a through-hole and the adjustment member is a cylindrical member inserted into the through-hole.

3. The lens barrel according to claim 1, wherein the through-hole has a female screw, the adjustment member has a male screw that is screwed with the female screw, and the adjustment member is displaced from the first position to the second position by rotating the adjustment member with respect to the through-hole.

4. The lens barrel according to claim 1, wherein a pressing force between the adjustment member and the helical groove in the first position is smaller than a pressing force between the adjustment member and the helical groove in the second position.

5. The lens barrel according to claim 1, wherein the helical groove has a bottom surface and a side surface, the adjustment member has a tip facing the bottom surface and a circumferential surface facing the side surface, the circumferential surface is relatively movably in contact with the side surface when the adjustment member is located in the first position, and the tip is relatively immovably in contact with the bottom surface when the adjustment member is located in the second position.

6. The lens barrel according to claim 5, wherein the side surface of the helical groove has a taper shape and the circumferential surface of the adjustment member has a taper shape corresponding to the side surface having the taper shape.

7. The lens barrel according to claim 5, wherein a ring-shaped raised portion is formed on the tip of the adjustment member.

8. The lens barrel according to claim 1, wherein the helical groove has a bottom surface including a small groove extending along the helical groove and a side surface, the adjustment member has a tip where a protrusion is formed which faces the small groove and which is greater than the width of the small groove and a circumferential surface facing the side surface, the circumferential surface is relatively movably in contact with the side surface when the adjustment member is located in the first position, and the protrusion is fitted into the small groove to fix the circumferential surface and the side surface to be relatively immovable when the adjustment member is located in the second position.

9. The lens barrel according to claim 1, wherein the fixed barrel has a pair of side walls extending outside the side surface of the helical groove, the adjustment member has a small diameter portion facing the side surface and a large diameter portion whose diameter is greater than a gap between the side surfaces, the small diameter portion is relatively movably in contact with the side surface when the adjustment member is located in the first position, and the large diameter portion is relatively immovably in contact with the side walls when the adjustment member is located in the second position.

10. The lens barrel according to claim 1, wherein a resistance means which provides a predetermined resistance when the adjustment member is displaced to the second position is formed between the adjustment member and the fixed barrel.

11. The lens barrel according to claim 10, wherein the resistance means is an O-ring.

12. The lens barrel according to claim 1, further comprising an operation ring by which magnification of a subject can be changed when observing the subject through the first and the second optical systems.

13. A loupe comprising the lens barrel according to claim 1.

14. The lens barrel according to claim 2, wherein the through-hole has a female screw, the adjustment member has a male screw that is screwed with the female screw, and the adjustment member is displaced from the first position to the second position by rotating the adjustment member with respect to the through-hole.

15. The lens barrel according to claim 2, wherein a pressing force between the adjustment member and the helical groove in the first position is smaller than a pressing force between the adjustment member and the helical groove in the second position.

16. The lens barrel according to claim 2, wherein the helical groove has a bottom surface and a side surface, the adjustment member has a tip facing the bottom surface and a circumferential surface facing the side surface, the circumferential surface is relatively movably in contact with the side surface when the adjustment member is located in the first position, and the tip is relatively immovably in contact with the bottom surface when the adjustment member is located in the second position.

17. The lens barrel according to claim 2, wherein the helical groove has a bottom surface including a small groove extending along the helical groove and a side surface, the adjustment member has a tip where a protrusion is formed which faces the small groove and which is greater than the width of the small groove and a circumferential surface facing the side surface, the circumferential surface is relatively movably in contact with the side surface when the adjustment member is located in the first position, and the protrusion is fitted into the small groove to fix the circumferential surface and the side surface to be relatively immovable when the adjustment member is located in the second position.

18. The lens barrel according to claim 2, wherein the fixed barrel has a pair of side walls extending outside the side surface of the helical groove, the adjustment member has a small diameter portion facing the side surface and a large diameter portion whose diameter is greater than a gap between the side surfaces, the small diameter portion is relatively movably in contact with the side surface when the adjustment member is located in the first position, and the large diameter portion is relatively immovably in contact with the side walls when the adjustment member is located in the second position.

19. The lens barrel according to claim 2, wherein a resistance means which provides a predetermined resistance when the adjustment member is displaced to the second position is formed between the adjustment member and the fixed barrel.

20. The lens barrel according to claim 2, further comprising an operation ring by which magnification of a subject can be changed when observing the subject through the first and the second optical systems.

* * * * *